No. 660,915. Patented Oct. 30, 1900.
H. MEYER.
SPOKE, TIRE, AND FELLY TIGHTENER.
(Application filed May 7, 1900.)
(No Model.)

Attest:
H. A. Muffley
Geo. F. White

Inventor:
Henry Meyer,
By J. E. Swett
atty.

THE NORRIS PETERS CO., PHOTO-LITHO., WASHINGTON, D. C.

ial in form and provided with radial
UNITED STATES PATENT OFFICE.

HENRY MEYER, OF DES MOINES, IOWA.

SPOKE, TIRE, AND FELLY TIGHTENER.

SPECIFICATION forming part of Letters Patent No. 660,915, dated October 30, 1900.

Application filed May 7, 1900. Serial No. 15,740. (No model.)

*To all whom it may concern:*

Be it known that I, HENRY MEYER, a citizen of the United States of America, and a resident of Des Moines, Polk county, Iowa, have invented certain new and useful Improvements in Spoke, Tire, and Felly Tighteners, of which the following is a specification.

The object of this invention is to provide improved means for tightening a spoke of a vehicle-wheel in the felly thereof and also for expanding the felly or fellies of a vehicle-wheel in the tire thereof, whereby the tire is tightened up to the fellies or rim of the wheel and the spokes are prevented from rattling.

My invention consists in the construction, arrangement, and combination of elements hereinafter set forth, pointed out in my claims, and illustrated by the accompanying drawings, in which—

Figure 1:
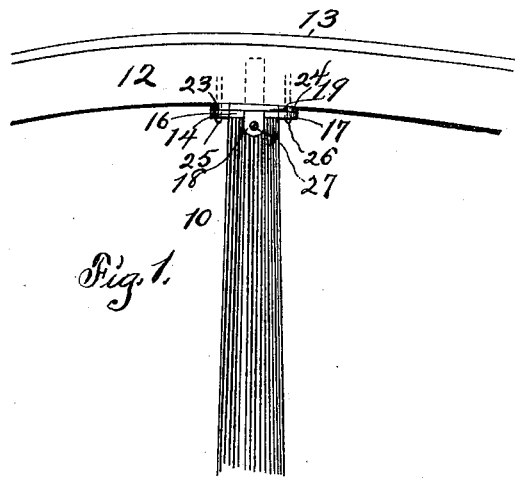
Figure 2:
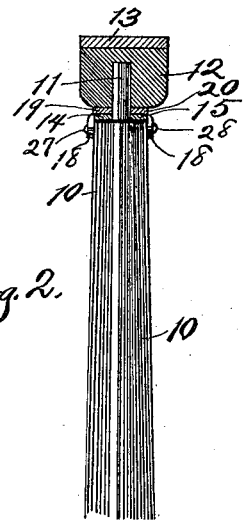
Figure 3:
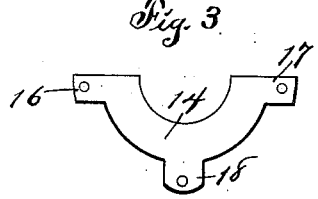
Figure 4:
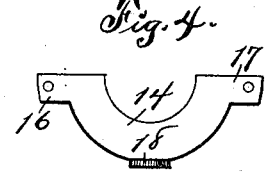
Figure 5:
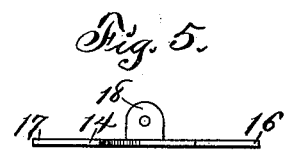
Figure 6:
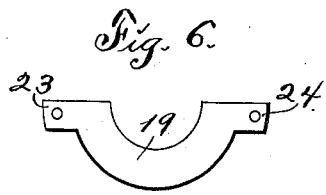

Figure 1 is a side elevation illustrating a segment of a vehicle-wheel and showing my improved device applied thereto. Fig. 2 is a vertical section on the indicated line 2 2 of Fig. 1. Fig. 3 is a detail plan of a blank from which a portion of my machine is made. Fig. 4 is a plan, and Fig. 5 is an elevation, of that portion of the device formed from the blank shown in Fig. 3. Fig. 6 is a plan of another portion of my device detached from the remainder.

In the construction and mounting of the device, as shown, the numeral 10 designates a spoke, 11 a dowel on one end of the spoke, 12 the fellies, and 13 the metallic tire, of a vehicle-wheel of ordinary construction. The tire 13 may be of any desired form, such as grooved, for the reception of a rubber tire or facing.

In the ordinary and continuous use of a vehicle-wheel there is a tendency of the wooden parts to shrink, resulting in a looseness or freedom of movement of the fellies or wooden rim in the metallic tire and a vibration or rattling of the dowel ends of the spokes in said wooden rim or fellies. When such a condition arises, I expand or force a felly outwardly relative to the spoke to provide a space between the shoulder of the spoke at the base of the dowel end thereof and the inner or concave face of the felly. Then I mount plates 14 15 of like construction in the space thus formed. The plates 14 15 are semicircular in form and provided with radial lugs 16, 17, and 18. The lugs 18 of the plates 14 15 are arranged to be bent at right angles to the body of the plates, and all of the lugs and plates are perforated or apertured. When the plates 14 15 are placed together in the space between the shoulder of the spoke and the concave face of the felly, the inner notches of said plates receive the dowel end of said spoke, and the lugs 16 17 are in contiguity or adjacent location to each other, while the lugs 18 of the plates are diametrically opposite each other and bent into parallel planes alongside of the spoke. If the space between the shoulder of the spoke and the concave face of the felly is greater than the thickness of the plates 14 15, I insert between said plates and the felly other plates 19 20 of the same general form and size as the first plates, but without the radial lugs 18. The plates 19 20 are so positioned that apertures 21 22 of ears 23 24 or lugs thereon are in alinement with the apertures of the lugs 16 17 of the plates 14 15. I secure the plates in position by staples 25 26, mounted in the apertures of the lugs 16 17 and 23 24, driven into the wooden substance of the felly. The staples serve to connect the four plates conjunctively to the felly and at the same time hold said plates in close contiguity with each other and embracing the dowel end of the spoke. I then further secure the plates by wood-screws 27 28, traversing the apertures of the ears or lugs 18 of the plates 14 15 and seated in the spoke. The wood-screws serve to connect the plates 14 15 to the spoke and prevent rattling of said spoke, and at the same time said screws, in conjunction with the staples, provide a secure and flexible connection between the spoke and felly. As many of the plates 14 15 are employed as is necessary properly to expand the wooden rim or fellies tightly into the tire or metallic rim of the wheel, and where the shrinkage is material I prefer to equip several of the spokes with the tightening devices rather than to employ more plates than have been described on any one spoke, as the result is the formation of a wheel more nearly circular than would be the case if a material shrinkage be compensated for by the devices applied to a single spoke. Where the shrinkage is very slight, I may omit the washer-plates 19 20 and employ only the plates 14 15, the staples 25 26, and wood-screws 27 28 in effecting the desired expansion of the fellies and securance of the spokes.

In the event of the use of my improved device upon a wheel wherein the felly has a tendency to crack or spread the plates 19 20 should be so placed that the ears 23 24 thereof may be bent upon the sides of the felly and attached thereto independently of the other plates. In the event that it is necessary to use more than one pair of the plates 19 20 on a single spoke they should be attached to the felly conjunctively with the plates 14 15.

I claim as my invention—

1. As an improved article of manufacture, the plate of semicircular form and provided with an inner notch and the lugs formed on said plate and radiating therefrom, which lugs are apertured and lie wholly outside the outer margin of the plate.

2. The plate of semicircular form and provided with the inner notch, the lugs on the periphery of said plate, two of said lugs being in the plane of the plate and the other lug being turned at right angles to the plane of the plate, said lugs being perforated or apertured.

3. The combination of the tire, felly and the spoke formed with a shoulder and dowel end, the counterpart plates mounted in contact with the concave face of the felly and embracing the dowel end of the spoke, ears on said plates and perforated two of said ears being turned at right angles to the plates, means for fastening the right-angled ears to the spoke and means for fastening the other ears to the felly.

4. The combination of the tire, felly and spoke formed with a dowel end entering the felly, the plates mounted on the concave face of the fellies and embracing the dowel end of the spoke, means for attaching said plates to the fellies and lugs or ears on said plates bent at right angles to the plates alongside of the spoke and arranged for attachment to said spoke.

5. The combination of the spoke formed with a dowel end, and felly formed with a dowel-seat to receive the dowel end of the spoke, the tire, the counterpart plates mounted upon the concave face of the felly and embracing the dowel end of the spoke, the washer-plates between the first plates and the felly and the staples whereby the plates are conjunctively attached to the felly.

6. The combination of the spoke formed with a dowel end, the felly formed with a dowel-seat to receive the dowel end of the spoke, the tire of endless form, the counterpart plates mounted on the concave face of the felly and each formed with inner notches to receive and embrace the dowel end of the spoke and radial lugs formed on and projecting from the outer margins of said plates, and washer-plates interposed between the first plates and the felly and formed with inner notches to receive and embrace the dowel end of the spoke and lugs on and radiating from the washer-plates and apertured in registration with the apertures of the first plates, and staples whereby said plates are conjunctively attached to the felly.

Signed by me at Des Moines, Iowa, this 14th day of March, 1900.

HENRY MEYER.

Witnesses:
S. C. SWEET,
H. A. MUFFLEY.